(No Model.) 2 Sheets—Sheet 1.
C. J. HARTMANN.
ELECTRODE FOR STORAGE BATTERIES.
No. 422,300. Patented Feb. 25, 1890.
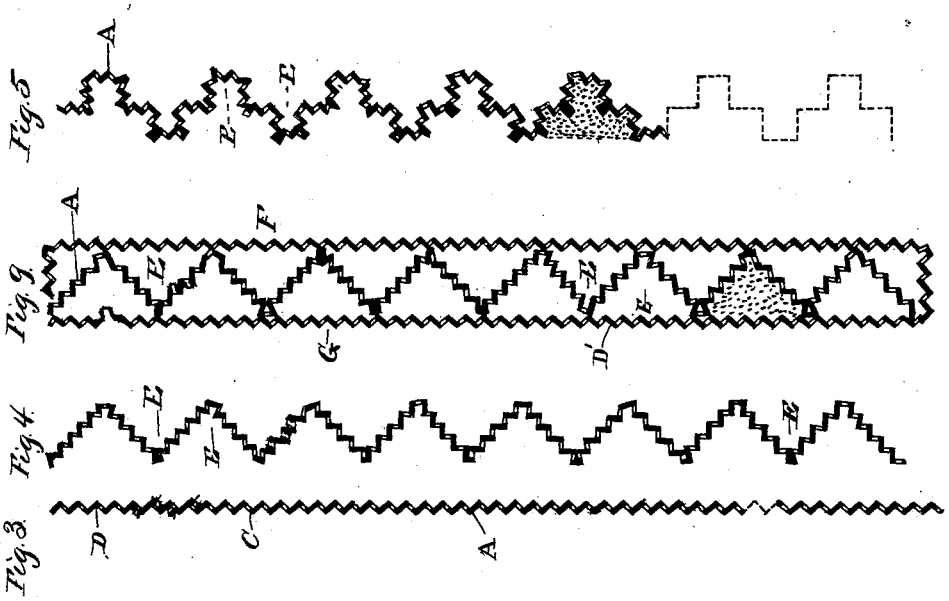
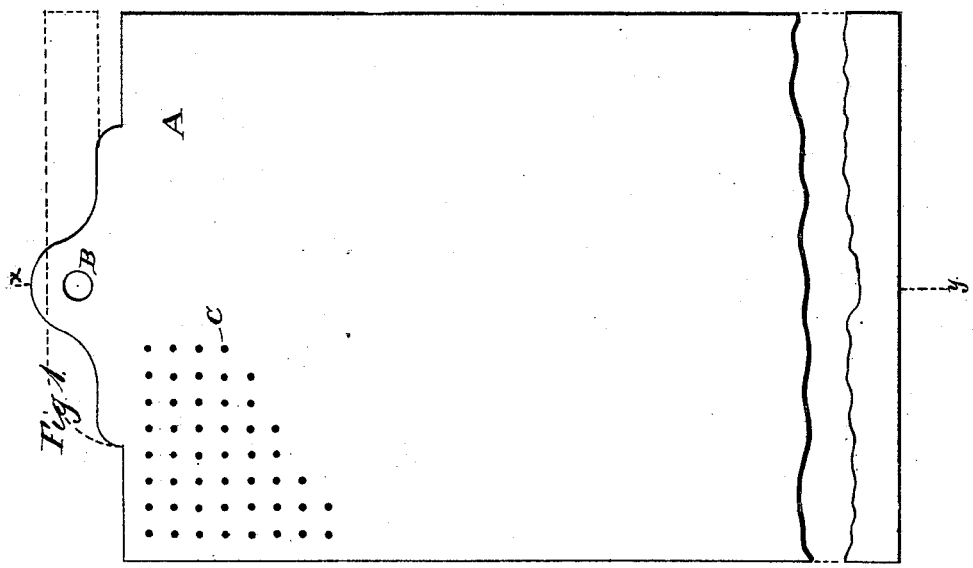
Witnesses
Inventor
Charles James Hartmann
By his Attorney
James M. Hicks

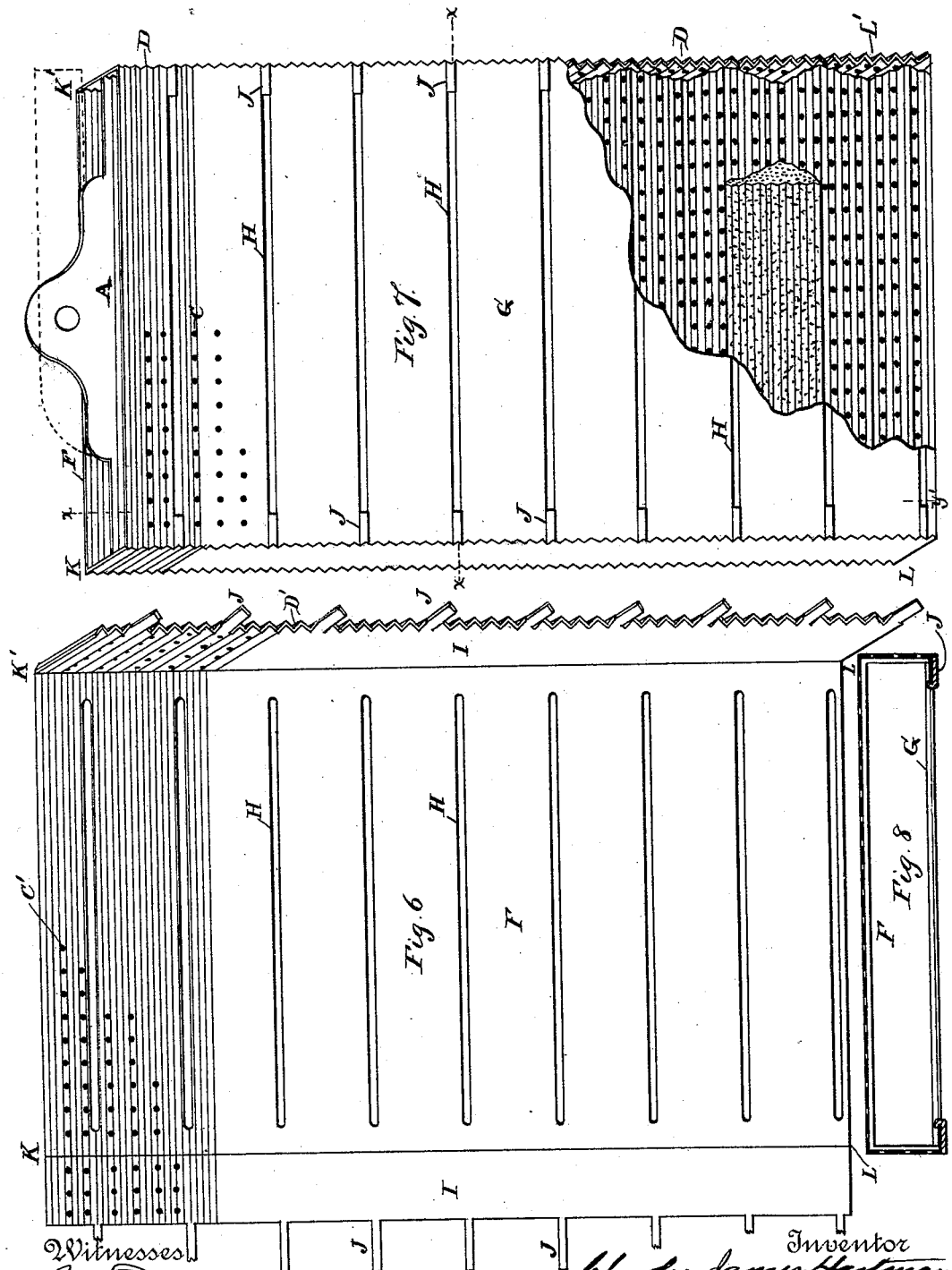

UNITED STATES PATENT OFFICE.

CHARLES JAMES HARTMANN, OF SUMMIT, NEW JERSEY.

ELECTRODE FOR STORAGE-BATTERIES.

SPECIFICATION forming part of Letters Patent No. 422,300, dated February 25, 1890.

Application filed June 20, 1889. Serial No. 314,995. (No model.)

*To all whom it may concern:*

Be it known that I, CHARLES JAMES HARTMANN, a citizen of the United States of America, residing at Summit, county of Union and State of New Jersey, have invented and made new and useful Improvements in Electrodes for Storage-Batteries; and I do hereby declare that the following is a full, clear, and exact description and specification of the same, reference being had to the drawings making part thereof.

The object of my invention is to provide an electrode for storage-batteries which by its construction exposes the largest amount of surface of active material to the battery-fluid in proportion to the amount of conductive material in the plates which sustain said active material, in order to obtain the greatest efficiency and storage capacity in proportion to the weight of the electrode and of the battery, and at the same time to avoid the falling away of the active material from the plates, and also to prevent the buckling and polarizing of the plates, and to simplify the method of manufacture and reduce the cost of the battery; and to this end my invention consists in certain elements and combinations of elements, fully set forth and claimed at the end of this schedule.

In order that persons skilled in the art may understand, construct, and use my invention, I will proceed to describe it, referring to the drawings forming part of this specification, in which—

Figure 1 represents a front view of the central conducting-plate of my electrode in the primary stage of its construction. It is formed from a sheet of conducting material, preferably of ordinary commercial pure lead, cut to the required shape and provided with flanged or jagged holes through its thickness for the free circulation of the battery-fluids, their flanged or jagged edges serving as conducting-points. In this view a few only of these holes are shown; but the whole plate is similarly constructed. Fig. 2 is a vertical central section of Fig. 1, and it shows these said holes for circulation throughout its whole length. Fig. 3 shows a vertical central section of Fig. 1 in the secondary part of its construction after said plate has been fluted horizontally or perpendicularly across its face. Fig. 4 shows a vertical central section of Fig. 1 in the third stage of its construction after it has been shaped into larger flutes to form triangular grooves or pockets across its face. Fig. 5 shows the same, with rectangular grooves formed across the face of the plate instead of triangular ones. Fig. 6 is an elevation of the incasing-plate formed of conducting material, and is provided with inwardly flanged or jagged holes and slots for the circulation of the battery-fluids through said plate, the flanges acting as conducting-points. This plate is fluted similarly to the central conducting-plate. It is shown bent at right angles on one side and flattened out at the other. At both sides it is constructed with projections for the purpose of securing it to another similar plate. (Shown in Fig. 8 in cross-section and in Fig. 7 in front elevation.) Fig. 7 is a prospective elevation of the whole structure when completed, showing the central conducting-plate boxed in by the incasing-plate, a portion being broken away to show the internal pockets or triangular grooves with the active material placed in one of them. Fig. 8 is a horizontal cross-section of Fig. 7 on line X Y. Fig. 9 is a vertical central section of Fig. 7 on line X' Y'. These holes and slots and the holes in all the other figures I do not generally punch out or drill, but punch through the metal with a tool, so as to force the metal ahead of it and leave a burr or flange around the holes, not only to prevent the active material falling out, but to facilitate the flow of the current to the interior of the body of active material.

A is the central conducting-plate. B is the hole through said conducting-plate by which the electric-conducting wire is connected to it.

C are the flanged or jagged holes through said conducting-plate for the circulation of the battery-fluid and conduction of electricity to and from the active material.

D are the flutings in the central conducting-plate, and D' the flutes in the incasing conducting-plates.

E are the grooves or pockets across the face of the central conducting-plate, made triangular, as in Fig. 4, or rectangular, as in Fig. 5.

F is the incasing conducting-plate, also fluted. It is provided with sides I and with projections J for bending into and fastening said plate to its sister incasing-plate G, also fluted. These plates F and G are constructed with internally-flanged holes C' and slots H to permit the battery-fluid to circulate through them.

I are the side pieces or flanges of the plate F, which fold at right angles to said plate on lines K L and K' L'.

J are the projections which secure the plates F and G together, which surround the central plate A to hold the active materials in the grooves E. These projections J fold into the slots H in plate G and hold the two together.

For my active material I use a dry powder and compress it into the internal flutes D and pockets E; or I bind the active material together in the form of a plastic mass by mixing it with rosin or gum reduced to a semi-fluid condition by alkali. This plastic material I compress into the grooves or pockets E and flutes D and hold it in position by the incasing-plates F and G, as shown in Figs. 7 and 8. I then dry it and place it in an acid bath, which neutralizes the alkali and leaves the mass in a porous or spongy condition. This largely increases the active surface and the storage capacity. The slots H in the plates F and G and the holes C' admit the battery-fluid to circulate into the grooves E, and the holes C in the plate A admit the battery-fluid to pass through it. This method of forming my electrodes is economical and inexpensive, as they can be made by any mechanic of ordinary intelligence without expensive machinery. By this construction I obtain the largest amount of conducting-surface in proportion to the size and weight of the plates, and I cause the electric current to approach as near as possible to each portion of the active material and to flow from points or jagged edges to said active material, and thereby facilitate the charging and discharging of the battery.

These electrodes are placed in a battery glass or receptacle and are connected to the electrical circuit and operated in the usual manner.

Having now fully described my invention and the manner in which I have embodied it, what I claim as new, and desire to secure by Letters Patent, is—

1. A conducting-plate for storage-batteries, finely fluted or furrowed on its face or faces and formed into larger flutes or furrows and constituting the double-fluted or furrowed plate A, substantially as specified.

2. An electrode for storage-batteries, consisting of the doubly-fluted or grooved plate A, substantially as described, and the incasing conducting-plates F and G, all combined and arranged to operate substantially as hereinbefore set forth.

3. An electrode for storage-batteries, consisting of the central conducting-plate A, fluted and grooved on its faces, the fluted incasing and conducting plates F and G, and the active storage material pressed into the internal flutes D, and the grooves E, all combined and arranged to operate substantially as described.

4. In an electrode for storage-batteries, the plate A, constructed with flutes D, grooves E, and flanged perforations C, all combined and arranged substantially as set forth.

5. In an electrode for storage-batteries, the incasing-plates F and G, constructed with flutes D' and flanged perforations C', arranged, substantially as described, to incase the central conducting-plate A and to hold storage material between the said conducting-plate A and the incasing-plates F and G, substantially as set forth.

CHARLES JAMES HARTMANN.

Witnesses:
WM. HUTCHISON,
J. O. H. CLARK.